Figure 1:
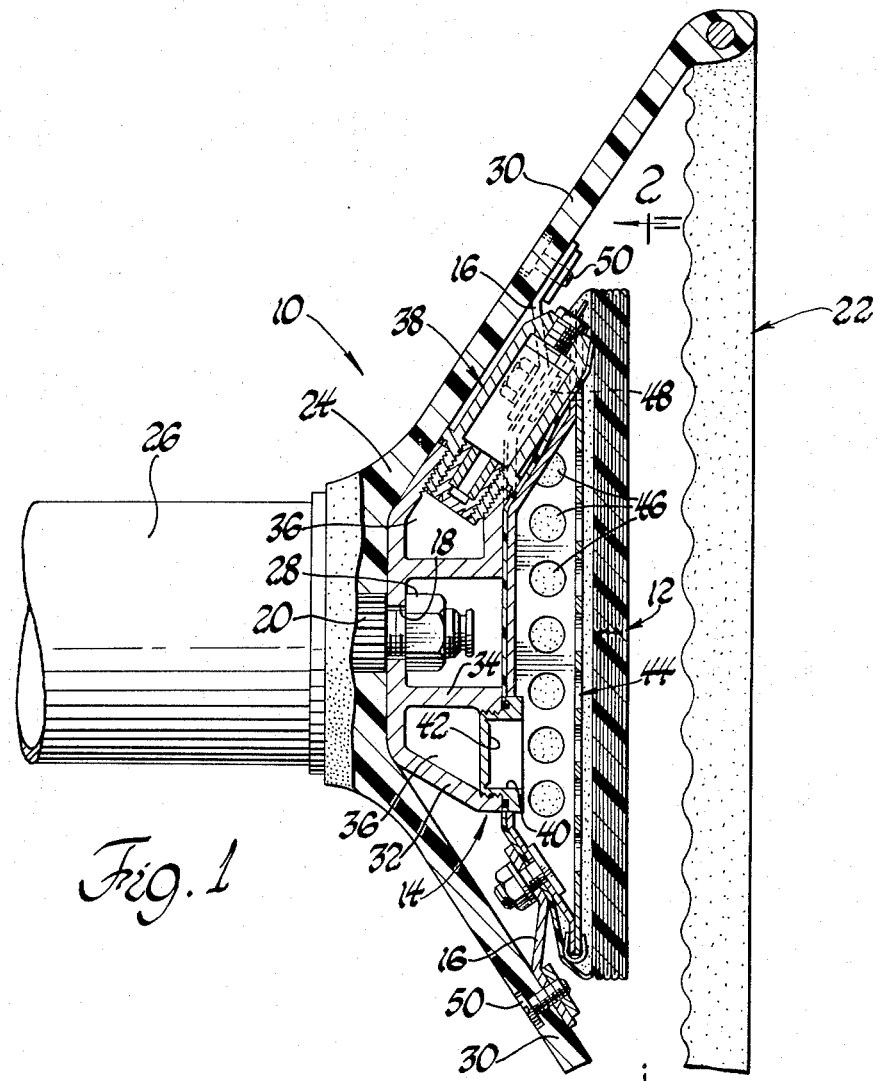

United States Patent

Lohr

[15] 3,674,284
[45] July 4, 1972

[54] VEHICLE SAFETY ASSEMBLY

[72] Inventor: Thomas E. Lohr, Warren, Mich.

[73] Assignee: Allied Chemical Corporation, New York, N.Y.

[22] Filed: Oct. 21, 1970

[21] Appl. No.: 82,563

[52] U.S. Cl. ..................................................280/150 AB
[51] Int. Cl. ..........................................................B60r 21/08
[58] Field of Search .............................................280/150, 87

[56] References Cited

UNITED STATES PATENTS

| | | | |
|---|---|---|---|
| 3,539,200 | 11/1970 | Chute | 280/150 |
| 3,580,603 | 5/1971 | Chute | 280/150 |
| 3,600,003 | 8/1971 | Carey | 280/150 |
| 3,532,360 | 10/1970 | Leising et al. | 280/150 |
| 3,506,281 | 4/1970 | Berryman | 280/150 |
| 3,552,769 | 1/1971 | Kemmerer et al. | 280/150 |

Primary Examiner—Kenneth H. Betts
Attorney—Jonathan Plaut

[57] ABSTRACT

A vehicle safety assembly including an inflatable bag which is attached to a cup-shaped member defining an annular chamber. A diffuser is disposed within the bag and a gas generator is in communication with the annular chamber in the cup-shaped member. The cup-shaped member has a hole centrally thereof for receiving the steering shaft and a pair of brackets interconnect the diffuser and the spokes of the steering wheel whereby the assembly may be associated with conventional steering assemblies.

5 Claims, 2 Drawing Figures

PATENTED JUL 4 1972

3,674,284

INVENTOR.
Thomas E. Lohr
BY
Barnard, McGlynn & Reising
ATTORNEYS

VEHICLE SAFETY ASSEMBLY

This invention relates to a vehicle safety assembly and more specifically to a vehicle safety assembly including an inflatable means for protecting or limiting the movement of an occupant of a vehicle during crash or collision conditions.

A great deal of effort has been expended to develop vehicle safety assemblies utilizing inflatable bags or confinements which are automatically inflated in response to a predetermined condition of the vehicle to prevent an occupant of the vehicle from contacting the various components of the vehicle. In other words, the bag is inflated during a crash to prevent the occupant of a vehicle from incurring serious injuries as a result of impact with the interior of the vehicle body.

Particular problems have been presented in designing such vehicle safety assemblies which are compatible with the steering column and steering wheel assemblies in automobiles. The steering wheel and steering column are obstacles to the inflation of bags. To prevent the steering wheel and steering column from being such obstacles, various systems have been developed whereby the inflatable bag is placed within the periphery of the steering wheel. The problem with such systems is that the steering column must be of a special design to accommodate the components of the inflatable bag assemblies. Additionally, prior art assemblies occupy an inordinate amount of space within the periphery of the steering wheel.

A vehicle safety assembly has been developed to overcome these problems and is disclosed and claimed in copending application Ser. No. 82,562 filed on Oct. 21, 1971 concurrently herewith in the name of Robert L. Stephenson and assigned to the Assignee of the instant invention. The instant invention represents a further improvement.

It is therefore an object and feature of this invention to provide an improved safety assembly which includes an inflatable means and inflation means for inflating the inflatable means and attachment means for attaching such means to a conventional steering shaft and a conventional steering wheel.

In correlation with the foregoing object and feature, it is another object and feature of this invention to provide such a vehicle safety assembly wherein the inflation means includes a cup-shaped member having a central cylindrical wall to define an annular chamber and a hole in the bottom of the cup-shaped member for receiving a steering shaft therethrough and whereby the entire assembly may be disposed within the periphery of a conventional steering wheel.

Figure 2:
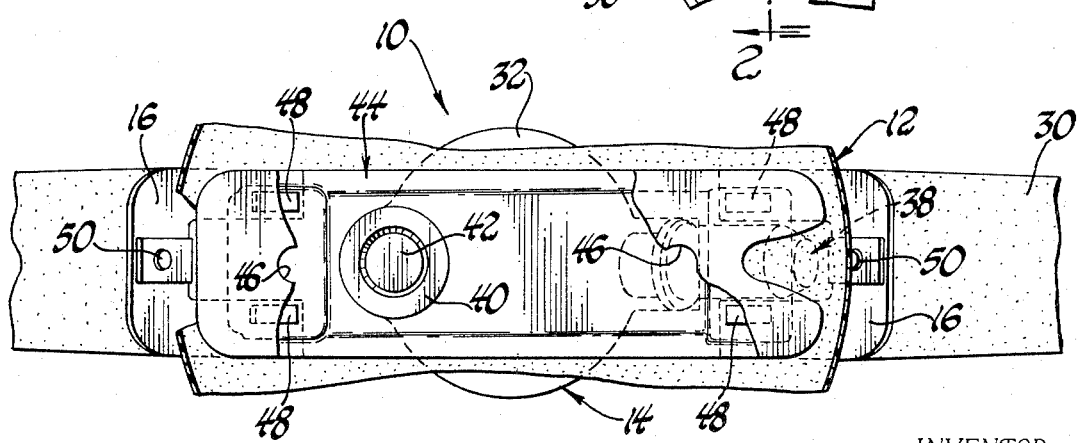

Other objects and attendant advantages of the present invention will be readily appreciated as the same becomes better understood by reference to the following detailed description when considered in connection with the accompanying drawings wherein:

FIG. 1 is a fragmentary cross sectional view of a preferred embodiment of the instant invention; and FIG. 2 is a fragmentary view taken substantially along line 2—2 of FIG. 1.

Referring now to the drawings, a vehicle safety assembly constructed in accordance with the instant invention is generally shown at 10. The vehicle safety assembly 10 includes an inflatable means comprising a bag 12 which has a collapsed position as illustrated in FIG. 1 and an extended or inflated position (not shown) for limiting the movement of an occupant of a vehicle.

The assembly also includes inflation means generally shown at 14 for inflating the bag 12.

Also included are the attachment means defined by the brackets 16 and the hole 18 for attaching the assembly to a steering shaft 20 and a steering wheel 22.

The steering shaft 20 is of the conventional variety and is splined for coaction with the hub 24 of the steering wheel 22. A tubular housing 26 surrounds the steering shaft 20. The end of the steering shaft 20 is threaded and a nut 28 is disposed thereon.

The steering wheel 22 is conventional and has an outer circular hoop or periphery which is joined to the hub 24 by spokes 30.

The inflation means 14 includes a cup-shaped member 32. The cup-shaped member 32 has a centrally disposed cylindrical wall 34 so as to define an annular chamber 36. The hole 18 is disposed in the bottom of the cup-shaped member 32 and the steering shaft 20 extends therethrough so that the nut 28 holds the cup-shaped member to the steering wheel 22 and to the steering shaft 20.

The inflation means also includes a source of pressurized fluid comprising the gas generator 38. The gas generator 38 is connected to the cup-shaped member 32 by threads so as to be in fluid communication with the annular chamber 36. The gas generator 38 contains a pyrotechnic which upon ignition generates gas pressures. An appropriate sensor is utilized to sense a crash or collision condition of the vehicle so as to send a signal to the gas generator 38 to ignite the pyrotechnic. Various such sensing devices are known in the prior art.

The cup-shaped member 32 includes a passage means defined by the threaded collet or sleeve 40 for establishing fluid communication between the annular chamber 36 and the interior of the bag 12. The sleeve 40 includes a rupturable disk 42 which has an annular weakened portion defined by a groove so that the disk is sheared from the sleeve 40 in response to a rise in pressure in the chamber 36.

The bag 12 is in sealing engagement with the cup-shaped member 32 about the sleeve 40. More specifically, the inflation means includes a diffuser 44 disposed within the bag and about the sleeve 40. The diffuser 44 is elongated and has a bottom having the cross section of a pie pan when viewed in longitudinal cross section. In other words, the diffuser has a flat bottom with the end walls thereof extending upwardly and outwardly at an angle and has a top disposed on such walls. The side walls are generally perpendicular to the bottom. The diffuser has a plurality of holes 46 in the walls thereof so that as the gas pressure moves from the chamber 36 into the diffuser, it is diffused before entering the bag 12.

A pair of bolts 48 extend through the inclined end walls of the diffuser. Each bolt has an elongated head which is welded to and in sealing engagement with an inclined wall of the diffuser 44. Each pair of bolts 48 extends through one of the brackets 16. The brackets 16 are secured by the bolts 50 to the spokes 30 of the steering wheel 22.

It will be appreciated from the foregoing description that the instant invention involves a vehicle safety assembly which is compact and may be attached to a conventional steering column and steering wheel without the requirement of providing a steering column or steering wheel with a special design.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:

1. A vehicle safety assembly comprising: inflatable means having a collapsed position and an extended position for limiting the movement of an occupant, a gas generator for inflating said inflatable means, attachment means for attaching said inflatable means and said gas generator to a steering shaft and to a steering wheel, passage means in said gas generator between said generator and said inflatable means, said inflatable means being in sealing engagement with said generator about said passage means, diffuser means disposed within said inflatable means and about said passage means for dispensing generated gases to the inflatable means, said diffuser means being elongated and having walls with a plurality of holes therein, a bracket secured to each end of said diffuser means for attachment to spokes of a steering wheel.

2. A vehicle safety assembly comprising: inflatable means having a collapsed position and an extended position for limiting the movement of an occupant, inflation means for inflating said inflatable means, attachment means for attaching said inflatable means and said inflation means to a steering shaft and to a steering wheel, said inflation means includes a cup-shaped member having a cylindrical wall to define an annular chamber, said attachment means including a hole in the bottom of said member and within said cylindrical wall for receiving a steering shaft therethrough, said for dispensing means includes a source of pressurized fluid connected to said cup-shaped member and in fluid communication with said annular chamber, said inflatable means comprises a bag, said cup-shaped member has a passage means therein for fluid communication between said annular chamber and said bag, said bag being in sealing engagement with said cup-shaped member about said passage means, said inflation means includes a diffuser means disposed within said bag and about said passage means, said diffuser means is elongated and has walls with a plurality of holes therein, said attachment means includes a bracket secured to each end of said diffuser means for attachment to spokes of a steering wheel.

3. An assembly as set forth in claim 2 wherein said source of pressurized fluid comprises a gas generator.

4. An assembly as set forth in claim 3 wherein said passage means includes a rupturable disc.

5. A vehicle safety assembly comprising: inflatable means having a collapsed position and an extended position for limiting the movement of an occupant, a gas generator for inflating said inflatable means, attachment means for attaching said inflatable means and said gas generator to a steering shaft and to a steering wheel, passage means in said gas generator between said generator and said inflatable means, said inflatable means being in sealing engagement with said generator about said passage means, said inflation means including a diffuser disposed within said inflatable means for dispersing generated gases to the inflatable means, said diffuser being elongated and secured at each end thereof to said steering wheel.

* * * * *

FO-1050
(5/69)

UNITED STATES PATENT OFFICE
CERTIFICATE OF CORRECTION

Patent No. 3,674,284        Dated    July 4, 1972

Inventor(s)  Thomas E. Lohr

It is certified that error appears in the above-identified patent and that said Letters Patent are hereby corrected as shown below:

IN THE SPECIFICATION

IN THE CLAIMS

Claim 2, column 3, line 7, "for dispensing" should be

-- inflation --.

Claim 5, column 4, line 10, "dispersing" should be

-- dispensing --.

Signed and sealed this 7th day of November 1972.

(SEAL)
Attest:

EDWARD M. FLETCHER, JR.
Attesting Officer

ROBERT GOTTSCHALK
Commissioner of Patents